J. W. HIGGS.
Hay-Elevator.
No. 210,255.   Patented Nov. 26, 1878.
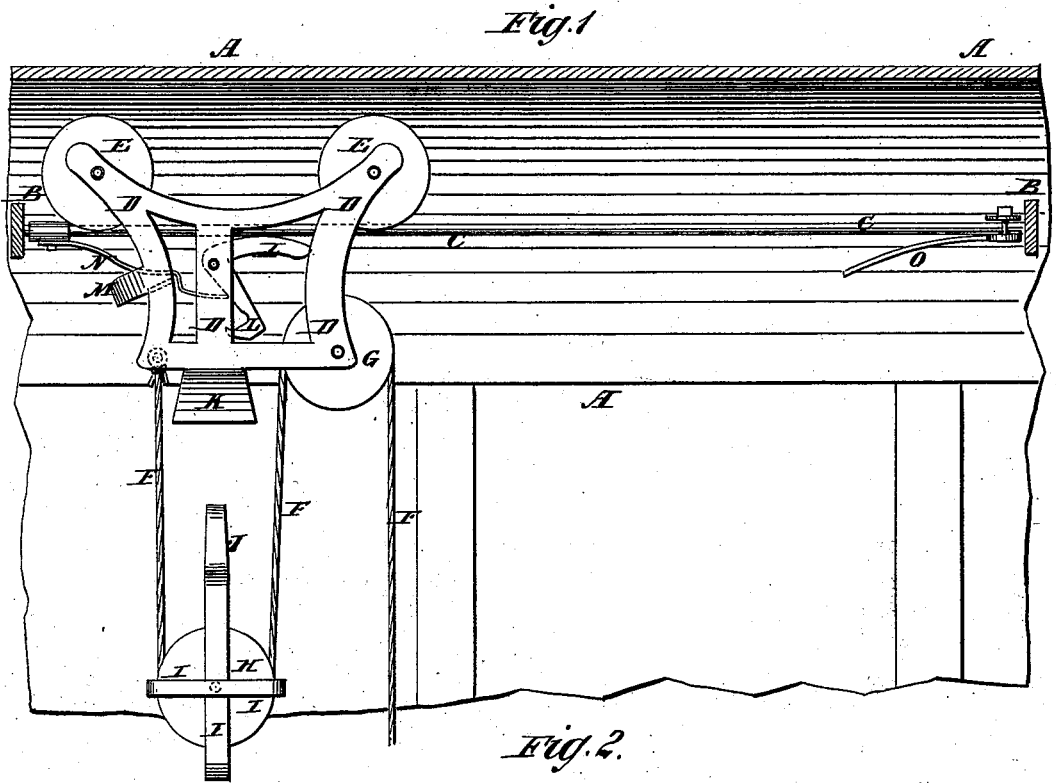
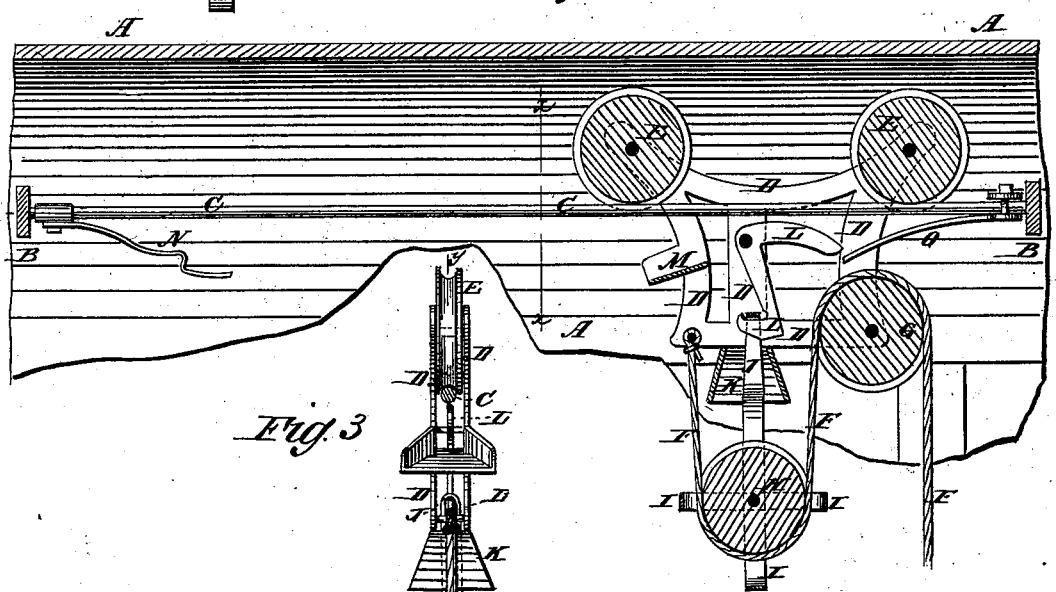
WITNESSES:
Francis McArdle.
C. Sedgwick
INVENTOR:
J. W. Higgs
BY Munn & Co.
ATTORNEYS.

UNITED STATES PATENT OFFICE.

JOSEPH W. HIGGS, OF SHARON, PENNSYLVANIA.

IMPROVEMENT IN HAY-ELEVATORS.

Specification forming part of Letters Patent No. 210,255, dated November 26, 1878; application filed October 14, 1878.

*To all whom it may concern:*

Be it known that I, JOSEPH W. HIGGS, of Sharon, in the county of Mercer and State of Pennsylvania, have invented a new and useful Improvement in Hay-Carriers, of which the following is a specification:

Figure 1 is a side view of my improved hay-carrier. Fig. 2 is a vertical longitudinal section of the same, taken through the line $y\, y$, Fig. 3. Fig. 3 is an end view of the same, the rod or track being shown in cross-section through the line $x\, x$, Fig. 1.

Similar letters of reference indicate corresponding parts.

The object of this invention is to furnish an improved device for moving hay from the wagon to the mow in barns, which shall be simple in construction and convenient and reliable in use.

A represents the roof of a barn or other building in which the hay is to be placed, to the rafters of which, or to other suitable supports, are attached two cross-bars, B. To the cross-bars B are secured the ends of a rod or rope, C, which forms the track for the carriage.

D is the carriage-frame, to the upper corners of which are pivoted two wheels or pulleys, E, the faces of which are grooved to receive and roll upon the rod or rope C. To one of the lower corners of the frame D is attached one end of the hoisting-rope F, which passes over a grooved pulley, G, pivoted to the other lower corner of the frame D. The rope F, between its stationary end and the pulley G, passes around a pulley, H, with the frame or block I of which the fork is connected. The rope F, after leaving the pulley G, passes over guide-pulleys until it is brought into such a position that a horse can be attached to its free end.

To the block or frame I of the pulley H is attached a long upward-projecting loop, J, which, when the pulley and fork are raised by drawing upon the rope F, passes up into a hopper-shaped guide-funnel, K, attached to the lower part of the frame D, and is guided by the said funnel into such a position as to be caught by the hook formed upon the end of the lower arm of the angular bar L. The angular hook-bar L is pivoted at its angle to the middle part of the frame D, and its upper arm is made of such a weight as to hold its hook-arm in such a position as to catch automatically upon the loop J as the said loop rises through the guide-funnel K.

To one end of the frame D is attached an inclined guide plate or spout, M, to guide the spring-latch N into place, and the inner edge of the said plate serves as a catch for the shoulder or offset of the said spring-latch N to catch upon. The outer end of the spring-latch N is secured to the rod or rope C in such a position as to hold the carriage directly over the place whence the hay is to be taken. The inner end of the spring-latch N projects into such a position as to push the hook of the hook-bar L out of the loop J and allow the pulley and fork to descend when the said carriage is drawn back against the said spring-latch N.

To the rod or cord C, over the place where the hay is to be dropped, is attached the outer end of a spring-stop, O, the inner end of which projects into such a position that it may pass beneath and raise the end of the upper arm of the hook-bar L, and withdraw the hook from the loop J when the carriage is drawn against it, so that the fork can be lowered without discharging the hay by slacking the hoisting-rope F.

In using the machine, the fork is loaded and the free end of the rope F is drawn forward, which raises the pulley H and the loaded fork. As the pulley H reaches the carriage-frame D the loop J enters the guide-funnel K, and strikes and raises the spring-latch N, releasing the said carriage and allowing it to be drawn forward by the rope F. As the carriage is drawn away from the spring-latch N the hook of the angle-bar L drops into the loop J, so as to support the pulley H and the loaded fork should the rope F be slackened. As the carriage and its load reaches the spring-stop O the said spring-stop raises the free end of the hook-bar L, and with its hook from the loop J, so that the pulley H and the loaded fork may be lowered by slacking the rope F. When the pulley H and the loaded fork have been sufficiently lowered they may be swung in any desired direction, and the hay discharged in any desired part of the mow. The pulley H and the unloaded fork may then be raised to the carriage by drawing upon the rope F, and by pulling upon the trip-rope the carriage will be drawn away from the spring-stop O and the hook of the bar L will drop into the loop J. The carriage may then be drawn by the trip-rope back to the spring-latch N, which forces back the hook-bar L and allows the pulley H and the unloaded fork to descend for another load.

If desired, the positions of the spring-latch N and the spring-stop O may be exchanged, and the apparatus may be used for transferring hay from the mow to the wagon.

I am aware that an angle-bar has been used to catch upon the beam, and thus to hold the carriage; but mine catches, locks, and unlocks the pulley-block. Also, that an upwardly-projecting one has been used, where the spring holds fast until the pulley-block strikes, and then goes off with a jerk; but my angle-bar hangs down, and the spring holds the carriage as well as unlocks the angle-bar. By my device I can load from a wagon to a barn, or from a barn to a wagon, which cannot be done by any similar device that is known to me.

What I claim is—

A hay-carrier provided with a downwardly-projecting angle-bar, L, pivoted at its angle to the carriage D, and operated in combination with the pulley-block, loop J, and spring N, arranged as shown and described, for the purpose specified.

JOSEPH WIALLEM HIGGS.

Witnesses:
PHILIP LEONARD,
JAMES A. BOYD.